US012065928B2

(12) United States Patent
Pogatschnigg et al.

(10) Patent No.: US 12,065,928 B2
(45) Date of Patent: Aug. 20, 2024

(54) CONTROL UNIT FOR MINING MACHINE

(71) Applicant: SANDVIK INTELLECTUAL PROPERTY AB, Sandviken (SE)

(72) Inventors: Reinhold Pogatschnigg, Katsch an der Mur (AT); Christian Umundum, Spielberg (AT)

(73) Assignee: Sandvik Intellectual Property AB, Sandviken (SE)

( * ) Notice: Subject to any disclaimer, the term of this patent is extended or adjusted under 35 U.S.C. 154(b) by 752 days.

(21) Appl. No.: 17/144,686

(22) Filed: Jan. 8, 2021

(65) Prior Publication Data

US 2021/0172253 A1 Jun. 10, 2021

Related U.S. Application Data

(62) Division of application No. 15/561,024, filed as application No. PCT/EP2015/057230 on Apr. 1, 2015, now abandoned.

(51) Int. Cl.
*E21B 7/02* (2006.01)
*E21C 35/24* (2006.01)
*F15B 13/08* (2006.01)

(52) U.S. Cl.
CPC .............. *E21B 7/022* (2013.01); *E21C 35/24* (2013.01); *F15B 13/0814* (2013.01); *F15B 13/0825* (2013.01); *F15B 13/0842* (2013.01); *F15B 13/0878* (2013.01); *F15B 13/0896* (2013.01)

(58) Field of Classification Search
CPC ...... E21B 7/022; E21C 35/24; F15B 13/0814; F15B 13/0825; F15B 13/0842; F15B 13/0878; F15B 13/0896
See application file for complete search history.

(56) References Cited

U.S. PATENT DOCUMENTS

| | | | | |
|---|---|---|---|---|
| 6,227,248 B1 * | 5/2001 | Miyazoe | F15B 13/0839 | 137/884 |
| 2003/0102030 A1 * | 6/2003 | Reichert | F15B 13/081 | 137/271 |
| 2004/0003850 A1 * | 1/2004 | Miyazoe | F16K 31/426 | 137/557 |
| 2009/0094971 A1 * | 4/2009 | Dantas | B66F 7/20 | 137/861 |
| 2009/0112151 A1 * | 4/2009 | Chapman | A61M 60/427 | 604/29 |
| 2012/0024406 A1 * | 2/2012 | Huang | F15B 13/043 | 137/625 |
| 2013/0153060 A1 * | 6/2013 | Barrett | G01N 33/004 | 137/551 |

(Continued)

FOREIGN PATENT DOCUMENTS

CN 200946749 Y 9/2007

*Primary Examiner* — Carib A Oquendo
(74) *Attorney, Agent, or Firm* — Corinne R. Gorski

(57) ABSTRACT

A control unit for controlling machine functions of a mining machine, such as an underground mining machine, tunneling machine or bolting rig, includes a flameproof housing having at least one fluid inlet and at least one fluid outlet, and a plurality of fluid control valves respectively communicating with the at least one inlet and outlet. In particular, the fluid control valves are formed inside at least one valve monoblock, the monoblock including a plurality of distinct fluid passages.

6 Claims, 7 Drawing Sheets

(56) References Cited

U.S. PATENT DOCUMENTS

2014/0182711 A1* 7/2014 Merth ................. F15B 13/0885
137/351
2015/0075660 A1* 3/2015 Inada .................. F15B 13/0871
137/884
2015/0107712 A1* 4/2015 Kobayashi ............ F16K 27/041
137/884

* cited by examiner

CONTROL UNIT FOR MINING MACHINE

RELATED APPLICATION DATA

This application is a divisional of U.S. patent application Ser. No. 15/561,024, which is a § 371 National Stage Application of PCT International Application No. PCT/EP2015/057230 filed Apr. 1, 2015.

TECHNICAL FIELD

The present disclosure relates to a control unit for controlling machine functions of a mining machine, in particular of an underground mining machine, tunneling machine or bolting rig. The disclosure further relates to a mining machine, in particular an underground mining machine, tunneling machine or bolting rig. Furthermore, the disclosure relates to a mining machine host control system, in particular for controlling an underground mining machine, tunneling machine or bolting rig.

BACKGROUND

The aforementioned devices and systems are used to control the operation of the aforementioned mining machines either by user input or in semi-automated or automated fashion. Typically, user commands are translated into machine functions which have to be communicated to different parts of the mining machines. The functions may be hydraulic functions, pneumatic functions or electric functions, for example. They may relate to mechanical functions, such as movement functions of manipulators, bolting rigs and the like. The devices and systems of the aforementioned type and the associated machinery are typically used in hazardous environments. Among other things, they are exposed to high temperatures and, for example during drilling operations of the mining machines, to flying sparks and possibly other risks of ignition.

Furthermore, mining machines and in particular underground mining machines have to operate in increasingly narrow space confines in today's working sites due to their geological structures. Underground mining machines are therefore increasingly required to be built in compact manner.

In all, the safety requirements for the aforementioned devices and systems call for reliable and flameproof, yet compact design.

From the prior art, control units or mining machines are known which have a flame-proof housing, for example available from Pempek. These commercially known control units however rely on standard internal valve technology consisting of standard directional valves and/or cartridge valves which have significant space demand and are not particularly flexible as far as their use is concerned. The design of the commercially available control units also bears a certain leakage risk.

Other known technologies for realizing machine control functions involve sandwich valve technology. While sandwich valve technology allows for relatively compact design, it requires flameproof certification for each component of the control unit.

It has therefore been an object of the disclosure to provide devices and systems of the initially mentioned type which mitigate the aforementioned disadvantages. In particular, it has been an object of the invention to provide devices and systems of the initially mentioned type which are reliable in function and at the same time allow for compact design.

SUMMARY

In a first aspect, the present control unit of the initially mentioned type includes a flameproof housing having at least one fluid inlet and/or outlet, and a plurality of fluid control valves respectively communicating with the at least one inlet and outlet, wherein the fluid control valves are formed inside at least one valve monoblock, the monoblock including a plurality of distinct fluid passages.

The term flameproof is understood to mean a reduced inflammability as required for example by standards ATEX, MSHA, MA, IECEx, DGMS or the like. The at least one monoblock includes one base body having the plurality of fluid passages along with bores for accommodating valve elements and—if needed—sensor parts, and/or with fixing means for externally attaching sensor/valve parts to the base body.

A fluid in the terms of the disclosure may be a hydraulic fluid, e.g. oil or water. Alternatively, a fluid may also be pressurized gas such as pressurized air. Each fluid control valve preferably may be operated to individually adjust the flow rate and/or fluid pressure in one respective fluid passageway provided in the at least one monoblock. The use of monoblock design for the valve blocks according to the present disclosure constitutes a beneficial combination of several effects: the valve monoblocks are extremely space-saving and allow for an implementation of a higher number of valve functions per housing volume. Secondly, the number of sealing elements and/or amount of sealing faces is greatly limited, in particular as compared to conventional valves and sandwich valves.

Further advantages seen in the use of monoblock and valve monoblocks instead of standard valves are that individual control circuits can be realized in an easy way. The monoblocks provide a very flexible and adaptable solution. Furthermore, each monoblock can provide individual flow rates and pressure levels. Still further, it becomes easier to implement safety standards inside the monoblocks themselves such as spool monitoring and the like. Still further, monoblock design is advantageous for the use inside the control unit as it allows higher operating pressures as compared to cartridge valves or standard valves. Monoblocks can be machined to be very rigid.

The at least one monoblock can be is mounted inside the flameproof housing and fully encompassed in the housing. In case a plurality of monoblocks are used, preferably several or all of the monoblocks are mounted inside the flameproof housing. An advantage of this embodiment is that the more functions are implemented inside the flameproof housing, the less parts are required to receive flameproof certification.

The flameproof housing can be is formed with a number of walls, the at least one inlet and outlet being formed as through-holes on at least one of the walls.

In a further preferred embodiment, with exception of the at least one fluid inlet and/or outlet, the housing is free of further fluid passages. Further fluid passages are for example understood to mean transverse fluid passages, passages for accommodating valves, cartridges etc.

The control unit can include a number of flame-sensitive components, wherein one, several or all of the flame-sensitive components are arranged inside the housing. "Flame-sensitive" is in the context of the invention understood to mean non-flameproof by itself. Accordingly, a flame-sensitive component is understood to be non-certified as flameproof. Exemplary flame-sensitive components may be electric circuitry such as PCB, solenoid drivers, and/or sensors.

In a further embodiment, at least one monoblock is mounted outside the flameproof housing. The external monoblock can include purely mechanical parts without electric components, or components which emit electricity at a sufficiently low level to prevent spark ignition from occurring. The at least one externally mounted monoblock may have a number of valves, which are pilot-controlled from inside the flameproof box by one or more valves, e.g. solenoid valves, provided inside the flameproof box, for example, in the internal monoblocks. The advantage herein is that it is possible to provide at least some sort of switching function also outside of the flameproof housing while at the same time, the inflammation/ignition risk is kept low. This is due to the fact that the electric component, which controls the valve, which might for example be a solenoid valve, is encapsulated inside the flameproof housing and thus shielded from the hazardous environment.

One, several or all of the fluid passages of the monoblock may include a dedicated control valve. The control valve can be a spool valve or cartridge valve. Alternatively or additionally, one, several or all of the fluid passages of the monoblock communicate with at least one sensor. The sensor can be at least one of: flow rate sensor, temperature sensor, pressure sensor, or combinations thereof.

The control unit according to a further preferred embodiment includes a plurality of monoblocks, each monoblock having a plurality of valve-controlled fluid passages dedicated to at least one predefined machine function. Each monoblock includes a plurality of fluid passageways and a plurality of valves and/or sensors for performing a plurality of fluidic switching and/or measuring functions, wherein particularly preferred, the functions are associated with a group of functions for a dedicated component to be controlled by the control unit. The predefined machine function can be at least one of: a drill motor control, drill rig movement control, drilling expendable supply device control, in particular expendable magazine control, expendable manipulator control, mining machine chassis control, or the like. By grouping the monoblocks, such that each monoblock or group of monoblocks relate to a certain machine function, the control unit receives a modular layout in which it becomes possible to easily locate and associate different types of machine functions which are to be governed by the control unit to different areas of the housing. Maintenance is greatly facilitated by this modular layout. It also becomes possible to retrofit existing control units with added functionality during the lifecycle of the mining machine which is operated by the control unit.

In a further preferred embodiment the control unit includes a data interface, and an electronic control device arranged to control machine functions, and/or receive and process external control input from a data interface, and/or transmit sensor signals to the data interface. The data interface may have a flameproof connector. By adding the data interface to the flameproof housing, implementation of electrics/electronics is facilitated. In particular if the data interface is a flameproof connector, the electric/electronic components inside the control unit are safeguarded in the same fashion as the hydraulic/pneumatic elements in the monoblocks. Furthermore, the electric/electronic components do no longer require flameproof certification. The data interface also enables installation of input/output processor boards (PCB) directly inside the flameproof housing to proportionally control electrically-controlled fluid valves and others directly from those boards. Those are preferably used to read out spool monitor sensor valves for key hydraulic valves.

The control unit may include at least one of: an inclinometer for providing an inclination signal, preferably to the electronic control device, a fluid detector for providing a leakage alarm signal, preferably to the electronic control device, and a door switch for providing a signal indicative of an opening of the flameproof housing, respectively communicating with the electronic control device. The inclinometer is arranged to indicate the inclination and orientation of the drilling machine itself provided that the control unit is installed on the drilling machine. This is a useful information for the operator or the operating system.

In another aspect, which at the same time can be seen in advantageous combination with the first aspect and alternatively as a separate aspect, the control unit includes at least one manifold, in fluid communication with the fluid inlet and/or fluid outlet of the flameproof housing, the manifold being releasably mounted externally on the control unit, for example, on the flameproof housing.

The manifold can be formed as one integrated manifold component for both inlet and outlet or other functions, or alternatively as at least two separate components, one for the inlet function, one or more for other function(s) (e.g. bolting, cutting, tramming, etc). For many functional units (e.g. bolting, cutting, crawler units, etc) a single manifold is not sufficient. Further, it is not always meaningful in practice to pack all the hydraulic circuits in one plate. For instance a separate manifold is used to serve the drill motor, while one or several additional manifolds are used for other machine functions. The purpose therefore is that it is easier for manufacturing and the manifold needs merely to be individually arranged if another drill motor is used.

Manifolds in terms of the disclosure are understood as blocks or monoblocks without valve and sensor elements which act purely as fluid passageways and/or bifurcations. A key advantage of the external manifolds according to the disclosure is that they allow for an extremely space-saving design, are robust, allow for high operating pressures and can be tailored to the individual machine function, which has to be supplied through the external manifold. At the same time, by customizing the external manifolds to their specific functionality, the flameproof housing of the control unit itself may be left unaltered and can be designed as a standard part. Thus, the second aspect suggests a system, which also provides economic benefits resulting from a standardized flameproof housing design combined with individualized external manifolds and/or internal valve monoblocks.

In another embodiment of the control unit, the at least one manifold(s) include(s) at least one fluid passage for connecting at least one predefined fluid supply to the control valves inside the flameproof housing, and at least one fluid passage for connecting the control valves inside the flameproof housing to the respective machine parts which are to be controlled.

The control unit further includes a manifold having a base plate, the base plate being releasably mounted to the flameproof housing, and including at least one of: a fluid inlet communicating with the fluid inlet and/or outlet of the flameproof housing, a fluid outlet communicating with the fluid inlet and/or outlet of the flameproof housing, and/or at least one sealing element effective to seal against exit and entry of fluids between the flameproof housing and the base plate.

The base plate can have the function of guiding fluid to and from the external manifolds, as well as to and from the valve monoblocks provided inside the flameproof housing. Also, the base plate can act as a mounting plate for installing the manifolds outside of the housing. By allocating this function to the base plate, the enclosure of the flameproof housing is allowed to remain more uniform.

In embodiments where the base plate is the only body attached to the flameproof housing, the base plate acts as a solitary manifold for providing the hydraulic/pneumatic functions to the devices that are to be controlled.

In embodiments that include a plurality of manifolds, the base plate can be attached to the flameproof housing as an intermediate manifold, which functions as a mounting interface for the other manifolds, and when necessary, also serves for one or more machine function. In case a plurality of manifolds are used, the manifolds attached to the base plate preferably have at least one fluid passage for connecting at least one fluid control supply to the control valves inside the flameproof housing. The use of a plurality of manifolds makes it easier to tailor the fluid passages and functionality of each manifold to the specific controlling function needed. Also, the manufacturing complexity is advantageously lowered by this.

In embodiments which include a base plate, the control unit further includes an inlet manifold and/or at least one functional manifold mounted to the base plate such that the inlet manifold is in fluid communication with the fluid inlet of the base plate, and the at least one functional manifold is in fluid communication with the fluid outlet of the base plate, wherein the at least one functional manifold is dedicated to at least one machine function of a mining machine, in particular an underground mining machine, tunneling machine or bolting rig.

In a third aspect, the present disclosure provides a mining machine of the initially mentioned type including a plurality of machine functions which are controlled by fluid circuits, for example, hydraulically, wherein the machine functions are controlled with a control unit of any one of the embodiments of the first and/or second aspects described hereinabove.

It is to be understood that the mining machine of the third aspect has the same embodiments as the control unit of the first and second embodiments. Regarding the details of those embodiments and the advantages and effects inherent therein, it is thus referred to the above description.

In a fourth aspect, the present disclosure provides a mining machine host control system of the initially mentioned type, having a control signal input unit, in particular a human-machine interface or a machine control system, a control unit for controlling machine functions of the mining machine, and at least one controller in signal communication with the control signal input unit and the control unit, and arranged to process operating commands received from the control signal input unit into control commands for the control unit, wherein the control unit is the control unit of any one of the embodiments of the first and/or second aspect described hereinabove. The controller can include a PLC, DSP or the like.

The host control system can communicate with the internal PCB(s) via a CAN-bus data communications interface and the unit also requires 24 VDC supply. An approved flameproof connector plug into the control unit can be used to provide clean, simple and reliable connection to an electric power supply, e.g. 24 V DC, and a data communication interface such as CAN-bus. The host control system implements automatic control and monitoring of the mining machine, e.g. a drill rig, via the control unit.

A separate flameproof box with a Programmable Logic Controller (PLC) can be mounted on, or near, the mining machine and connects directly to one or more control units via a local, dedicated CAN-bus connection. The operator control interface to the PLC can be a pendant control. An internal or external display is used for visualization of the control unit's functions.

The PLC itself can be connected (for example, on a machine-wide CAN-bus network) to a master machine control system. This control system may have a supervisory control and monitoring role and also has the ability to turn on, and turn off, the fluid power source necessary to power the mining machine.

In a further aspect the present disclosure suggests the use of valve monoblocks for controlling machine functions of a mining machine, in particular an underground mining machine, tunneling machine or bolting rig, the monoblock having a plurality of distinct fluid passages and being mounted to a control unit according to any one the preferred embodiments.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
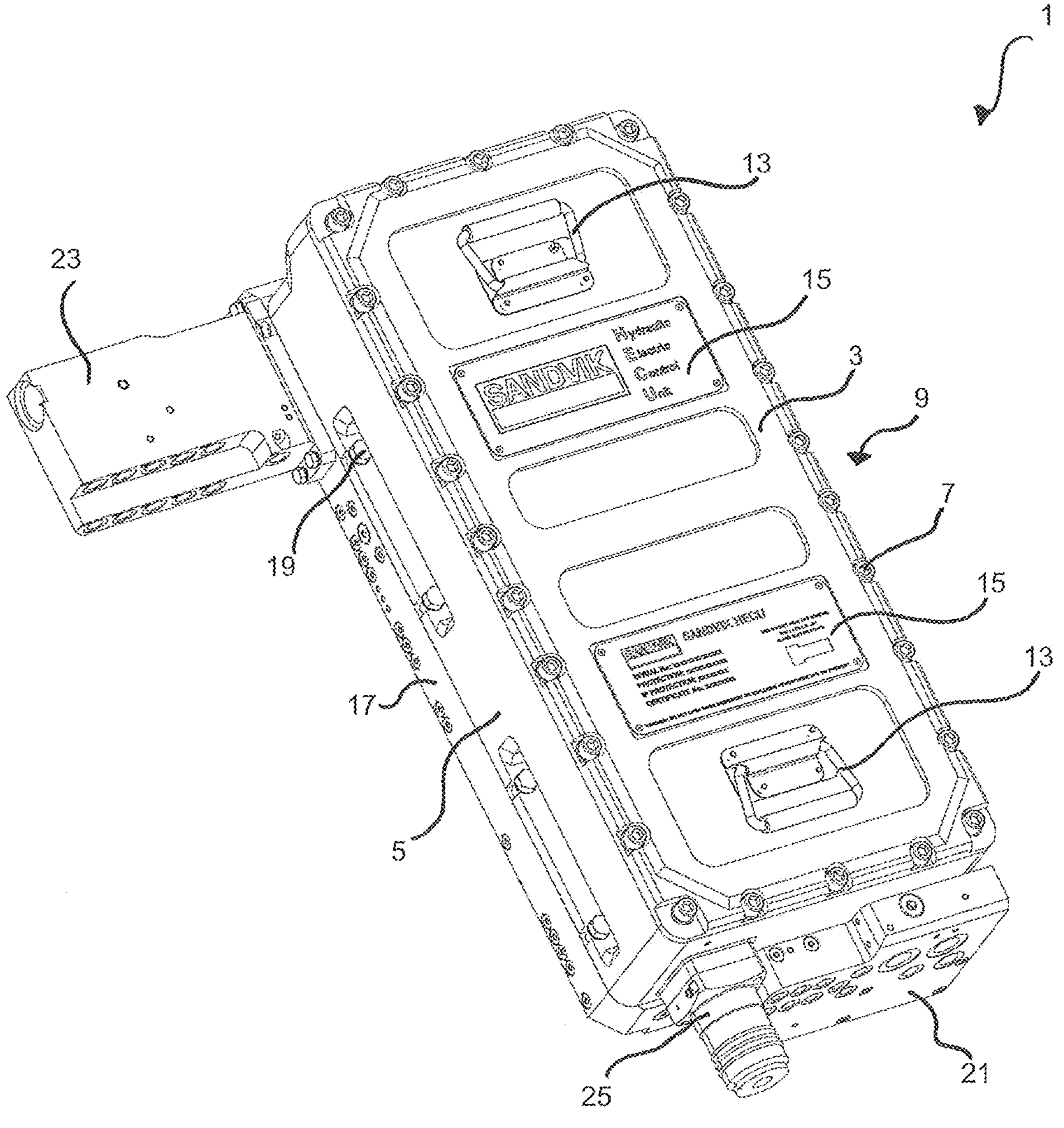
FIG. 1 is a schematic three-dimensional view of a control unit according to an embodiment.

FIG. 1 shows a control unit 1. The control unit 1 includes a cover 3. The cover 3 is attached to a flameproof box 5 with fastening means 7, which can be for example, screws. Together, the cover 3 and the flameproof box 5 constitute a flameproof housing 9. The cover 3 includes a pair of handles 13 and identification plates 15.

The flameproof housing 9 is attached through a base plate 17, also referred to as an intermediate plate, with second fastening means 19, which in the preferred embodiment are screws.

A first external manifold 21 is attached to and in fluid communication with the base plate 17. The first external manifold 21 may, for example, be an inlet manifold or outlet manifold or is for external functions.

Furthermore, a second manifold 23 is attached to and in fluid communication with the base plate 17. The second external manifold 23 may for example be an inlet manifold or outlet manifold or be used for external functions. Also attached to the flameproof housing 9 is a data interface 25 which may for example be a flameproof connector.

Figure 2:
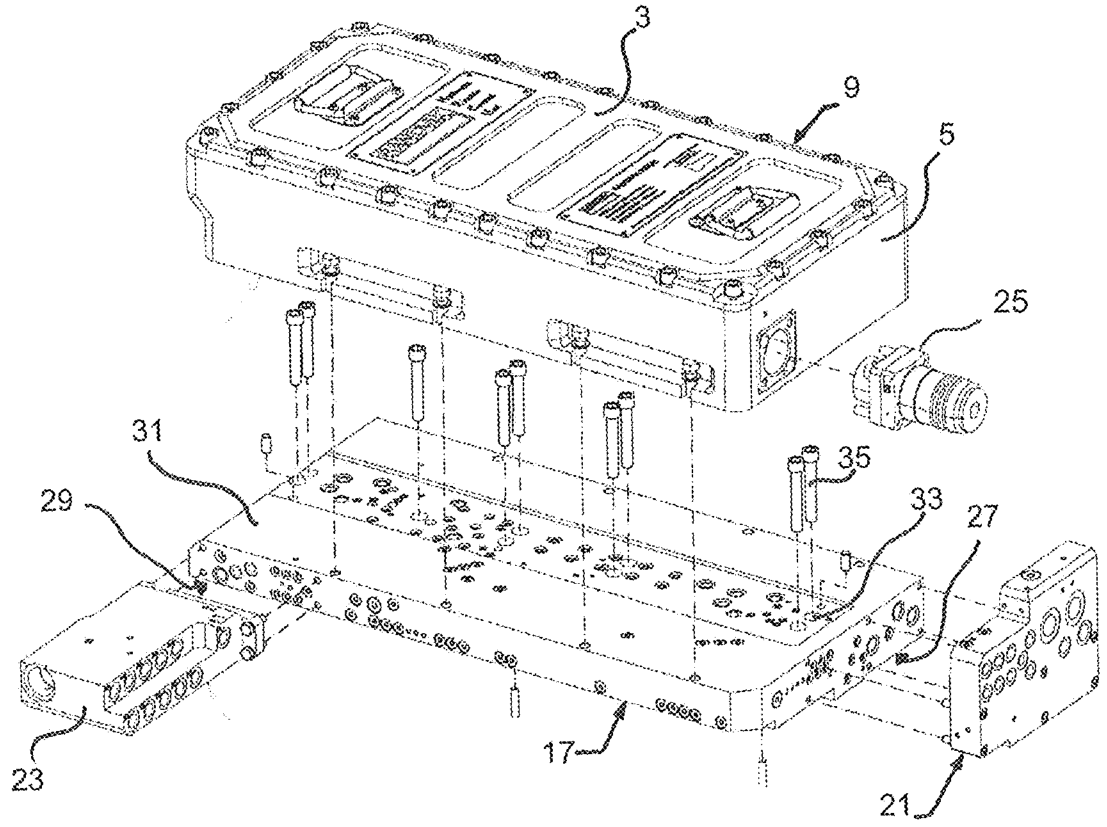
FIG. 2 is a first exploded view of the control unit of FIG. 1.

FIG. 2 shows the control unit 1 of FIG. 1 in a partially exploded state. The base plate 17 includes at least one fluid inlet 27 and at least a first outlet 29 in fluid communication with the second external manifold 23. Furthermore, the base plate 17 includes a number of (not shown) fluid passageways, which are in fluid communication with fluid ports which open to the top surface 31 of the base plate. The top surface 31 is facing the flameproof box 5. When mounted as can be seen from FIG. 2, the fluid ports opening to the top surface 31 are in fluid communication with a number of fluid inlets and/or outlets 28 of flameproof housing.

Figure 3:
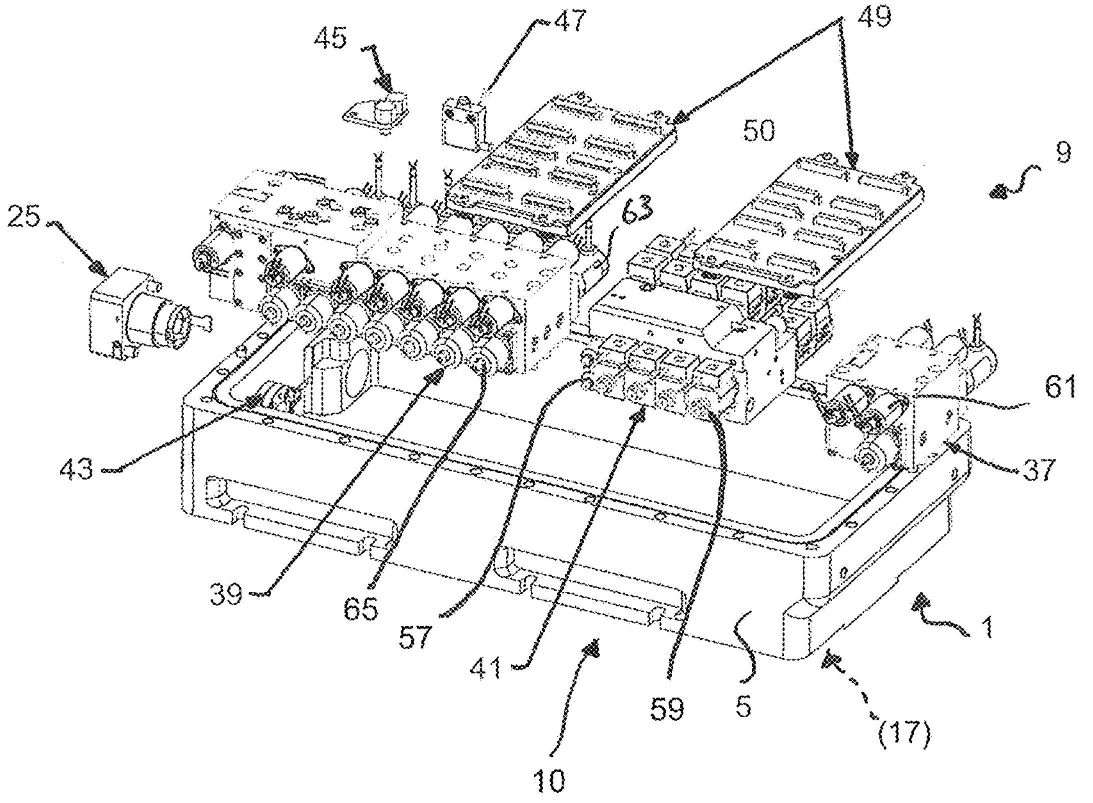
FIG. 3 is a second exploded view of the control unit of FIGS. 1 and 2.

The base plate 17 further includes a number of threaded bores 33 arranged to receive corresponding screws 35 for fastening the number of valve monoblocks to the base plate 17 (see FIG. 3).

FIG. 3 shows the components mounted inside the flameproof housing, and in particular inside the flameproof box 5 of the control unit 1. In addition to the elements already shown in FIGS. 1 and 2, FIG. 3 mainly shows a number of valve blocks for realizing the hydraulic functions of the control unit 1 and/or for realizing any pneumatic functions. In particular, first, second and third monoblocks 37, 39, 41 are provided. The monoblocks are attached to the base plate 17 only (cf. FIG. 2). Furthermore, the valve monoblocks 37, 39, 41 are in fluid communication with the base plate 17 only.

The first monoblock 37 contains the hydraulic functions for operating a drill motor. The second monoblock 39 includes the hydraulic functions for driving, e.g. pivoting an arm holding a drill rig or the like. Furthermore, the third monoblock may exemplarily comprise the hydraulic functions for operating a supply magazine, manipulator, rod handler or the like.

Further monoblocks might be added to provide hydraulic and/or pneumatic functions for the chassis of the mining machine, water supply systems etc.

Arranged inside the flameproof box 5 is a first sensor 43 in the form of an inclinometer for determining the orientation and any tilting movements of the control unit 1. The control unit 1 also includes a second sensor 45 in the form of a fluid detector, for example, an oil detector, for providing a leakage alarm signal in case of any leakage of fluid inside the flameproof box 5.

Furthermore, the control unit 1 includes third sensor 47 in the form of a door switch for providing a signal indicative of an opening of the flameproof housing. The control unit 1 is arranged to stop all switching operations involving electricity or any other spark ignition sources whenever the door switch indicates that the flameproof housing 9 has been opened to avoid any flammable material entering the flameproof housing or fluid inside the flameproof housing resulting from leakage to ignite.

In addition to the fluid control functions exerted by the valve monoblocks 37, 39, 41, the flameproof box 5 also houses a number of electronic components, for example, in the form of printed circuit boards 49. The electronic components can constitute or form part of an electronic control device 50 which is arranged to control the machine functions triggering the fluid control valves provided in the valve monoblocks, and/or adapted to receive and process external control input from the data interface 25 and/or which is adapted to transmit signals from the sensors 43, 45, 47 or from further sensors provided in the valve monoblocks 37, 39, 41 to the data interface 25.

Figure 4:
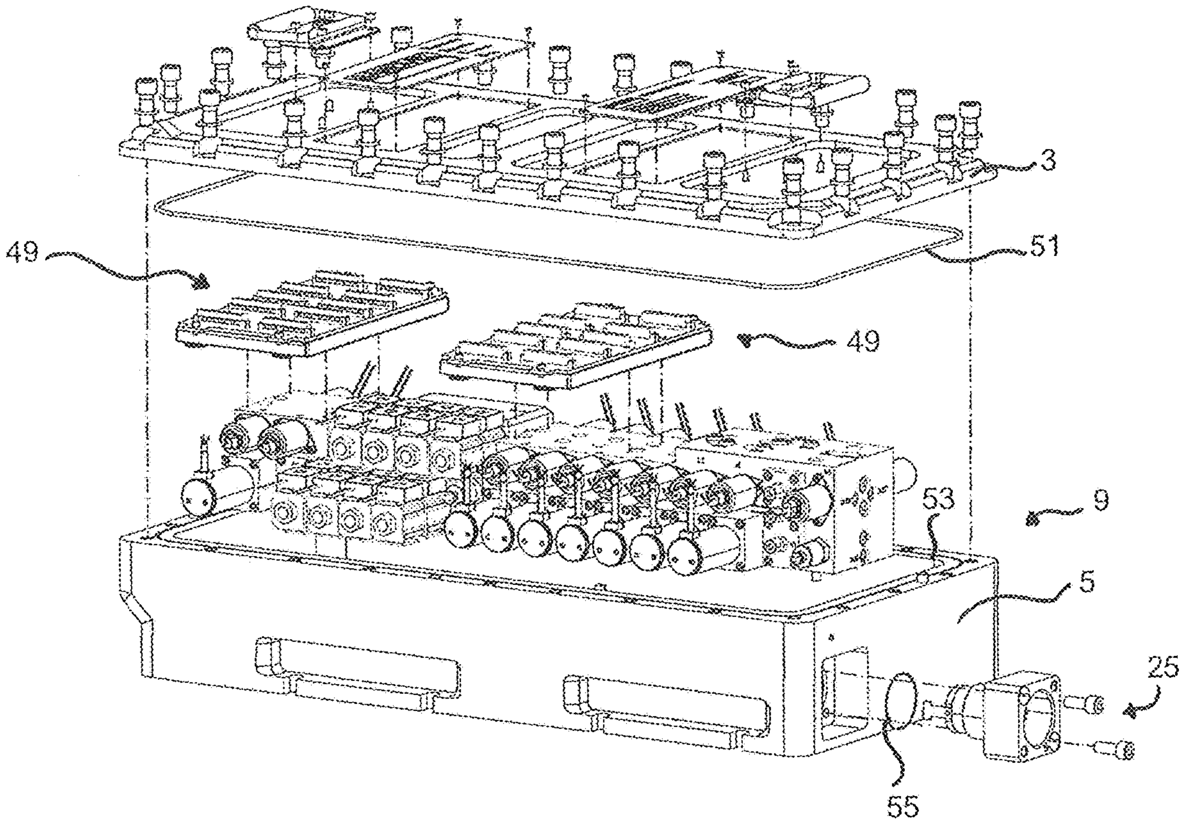
FIG. 4 is a third exploded view of the control unit of FIGS. 1-3.

As can be seen in particular from FIG. 4, the electronic components 49 are mounted on top of the valve monoblocks 37, 39, 41.

The flameproof housing 9 can be sealed against unwanted entry and exit of fluids by a sealing lip or band 51 extending circumferentially along the cover 3. The sealing lip band 51 is arranged to seal off the opening between the cover 3 and the flameproof box 5. The flameproof box includes a groove 53, at least partially, receiving the sealing lip or band 51.

The data interface 25 can be sealed against the flameproof box 5 with a sealing element such as an O-ring 55. Further sealing elements located to seal the base plate 17 (FIGS. 1 and 2) against the flameproof box 5 and/or the manifolds 21, 23 against the base plate 17, and/or to seal the valve monoblocks 37, 39, 41 against the base plate 17, are not shown for the sake of clarity of the figures, but are understood to be optionally present for improved sealing characteristics.

As can in particular be seen from FIGS. 3 and 4, a large variety of control components can be mounted and unmounted to the valve monoblocks. In the present embodiment, the components 57, 59, 61, 63, 65 are mounted laterally onto the monoblock structures. By way of example only, the first monoblock includes a number of solenoid valves 61. The second monoblock 39 includes a number of position valves 63 located opposite of spring packs 65 associated with main control pistons (not shown).

The third monoblock 41 includes a number of screw-in cartridge valves 59 and pressure sensors 57. Valve functionality can be added as is demanded by the respective machine function for each monoblock.

Figure 6:
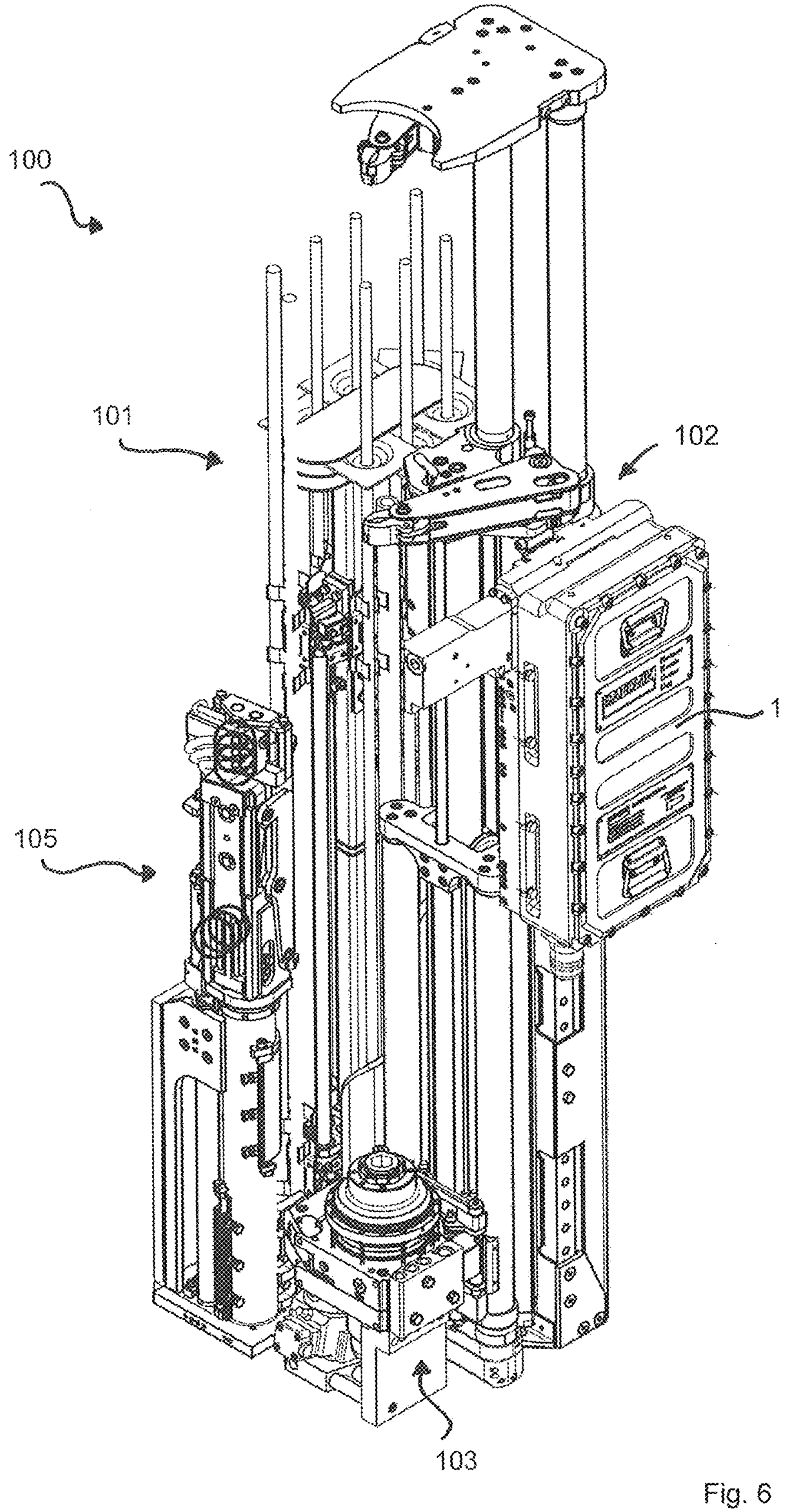
FIG. 6 is a schematic three-dimensional view of a drilling machine according to an embodiment.

By way of example, FIG. 6 shows an underground mining machine in the form of a drill rig 100. The drill rig 100 includes the control unit 1, which has already been explained with reference to FIGS. 1 through 4.

The control unit 1 is mounted to a support structure 102 and is arranged to control, for example, the drill motor 103 of a drill rig. The drill rig 100 further includes a drilling expandable supply magazine 101 and a drilling expendable handling mechanism 105, which may be a semi-automated or automated manipulator. By allocating respective valve monoblocks to each of the machine functions for the drill motor 103, the manipulator 105 or the supply magazine 101, the control 1 can be arranged to control one, several or all of the machine functions of the underground mining machine in the form of the drill rig 100.

Figure 5:
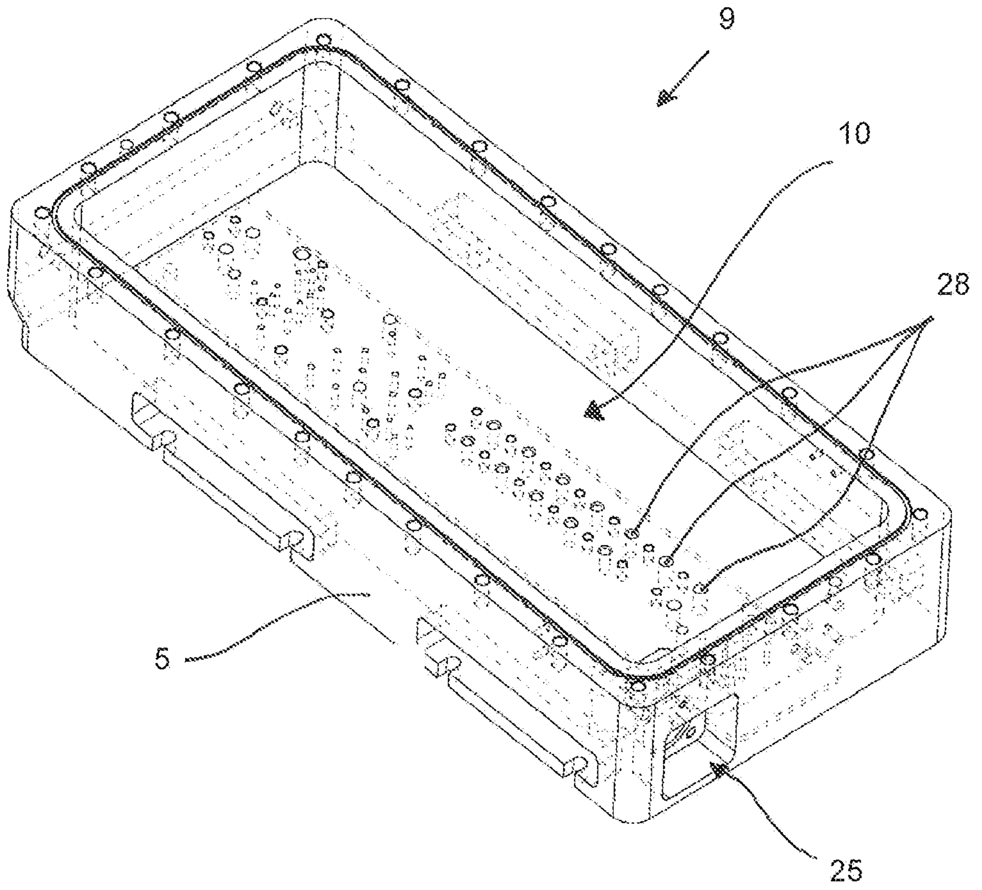
FIG. 5 is a schematic three-dimensional view of the flameproof housing of FIGS. 1-4.

FIG. 5 shows the location of the number of fluid inlets/outlets 28 in a bottom face 10 of the flameproof housing 9. When mounted, these inlets/outlets 28 are in fluid communication with correspondingly arranged fluid ports of the base plate 17 (cf. FIGS. 2, 3). Only a few selected inlets/outlets are designated with reference signs for ease of legibility.

Figure 7:
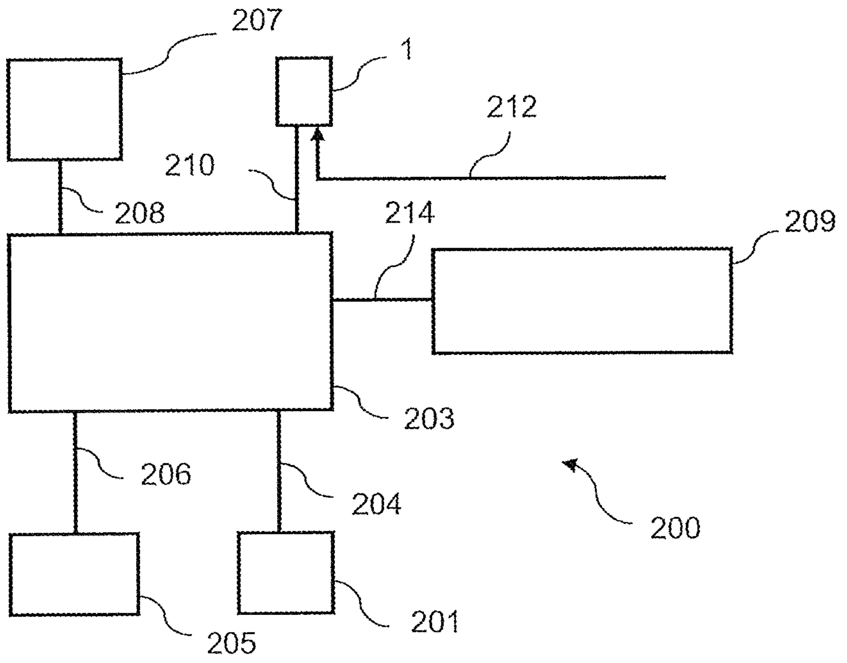
FIG. 7 is a schematic drawing of a host control system of a mining machine according to an embodiment.

FIG. 7 schematically shows a mining machine host control system in accordance with the present disclosure. The host control system 200 includes the control unit 1 also explained with reference to FIGS. 1 through 4. Furthermore, the system 200 includes a human-machine-interface (HMI) 201, which is a control signal input unit and a main controller 203. The human-machine-interface 201 is connected for signal transmission with the controller 203.

The controller 203 also is connected through a signal transmission means such as for example a local CAN bus and/or a power supply to a display unit 205 for displaying control inputs and outputs and the like.

The controller 203 is furthermore connected to an IS junction box 207 through signal transmission 208.

The control unit 1 is connected to the controller 203 through a signal transmission such as for example a local CAN bus and/or power supply 210. For example, the signal transmission means are coupled into the control unit 1 through the data interface 25 (see FIGS. 1 through 4).

The control unit 1 is supplied with hydraulic fluid or pneumatic fluid through a fluid supply line 212. The controller 203 may optionally be a data and/or power communication through a supply line 214 with a machine control system 209. Due to the single data interface and the modular design of the control unit 1, system implementation into the host system is easily accomplished.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A control unit for controlling machine functions of a mining machine, in particular of an underground mining machine, tunneling machine or bolting rig, the control unit comprising:

a flameproof housing having at least one fluid inlet and/or outlet;

a plurality of fluid control valves communicating with the at least one inlet and outlet, wherein the fluid control valves are formed inside at least one valve monoblock, the at least one monoblock including a plurality of fluid passages, wherein the at least one valve monoblock is mounted inside the flameproof housing and is fully encompassed in the flameproof housing; and at least one manifold in fluid communication with the fluid inlet and/or outlet of the flameproof housing, the at least one manifold being releasably mounted externally on the control unit on the flameproof housing.

2. The control unit of claim 1, wherein the at least one manifold includes at least one fluid passage for connecting at least one fluid supply to the control valves inside the flameproof housing, and at least one fluid passage for connecting the control valves inside the flameproof housing to respective machine parts which are to be controlled.

3. The control unit of claim 1, wherein the at least one manifold includes a base plate, said base plate including at least one of a fluid inlet communicating with the fluid inlet and/or outlet of the flameproof housing; a fluid outlet communicating with the fluid outlet of the flameproof housing; and at least one sealing element arranged to seal against exit and entry of fluids between the flameproof housing and the base plate.

4. The control unit of claim 1, further comprising an inlet manifold and/or at least one functional manifold mounted to the base plate such that the inlet manifold is in fluid communication with the fluid inlet of the base plate, and the at least one functional manifold is in fluid communication with the fluid outlet of the base plate, wherein the at least one functional manifold is dedicated to at least one machine function.

5. A mining machine selected from an underground mining machine, tunneling machine or bolting rig, comprising a plurality of machine functions which are controlled hydraulically by fluid circuits, wherein said machine functions are controlled with a control unit, the control unit including a flameproof housing having at least one fluid inlet and/or outlet, and a plurality of fluid control valves communicating with the at least one inlet and outlet, wherein the fluid control valves are formed inside at least one valve monoblock, the at least one valve monoblock including a plurality of fluid passages, wherein the at least one valve monoblock is mounted inside the flameproof housing and is fully encompassed in the flameproof housing.

6. A mining machine host control system arranged for controlling an underground mining machine, tunneling machine or bolting rig, the control system comprising:

a control signal input unit selected from a human-machine interface and a machine control system;

a control unit for controlling machine functions of the mining machine; and at least one controller in signal communication with the control signal input unit and the control unit, and arranged to process operating commands received from the control signal input unit into control commands for the control unit, the control unit comprising:

a flameproof housing having at least one fluid inlet and/or outlet; and a plurality of fluid control valves communicating with the at least one inlet and outlet, wherein the fluid control valves are formed inside at least one valve monoblock, the at least one monoblock including a plurality of fluid passages, wherein the at least one valve monoblock is mounted inside the flameproof housing and is fully encompassed in the flameproof housing.

* * * * *